United States Patent [19]
Suto et al.

[11] Patent Number: 5,435,634
[45] Date of Patent: Jul. 25, 1995

[54] ANTI-LOCK CONTROL METHOD FOR VEHICLE

[75] Inventors: Shinji Suto; Yoshiyuki Sugimoto; Hiromi Inagaki; Kazuya Sakurai, all of Wako, Japan

[73] Assignee: Honda Giken Kogyo Kabushiki Kaisha, Tokyo, Japan

[21] Appl. No.: 143,904

[22] Filed: Nov. 2, 1993

[30] Foreign Application Priority Data

Nov. 4, 1992 [JP] Japan .................................. 4-295391

[51] Int. Cl.$^6$ .............................................. B60T 8/32
[52] U.S. Cl. .................................. 303/100; 303/113.4
[58] Field of Search ................. 303/3, 15, 20, 100, 303/113.4, 115.4, 115.5, 116.1; 364/426.02

[56] References Cited

U.S. PATENT DOCUMENTS

| | | | |
|---|---|---|---|
| 4,795,219 | 1/1989 | Brearley et al. | 303/100 |
| 4,836,618 | 6/1989 | Wakata et al. | 303/100 |
| 5,150,298 | 9/1992 | Fujioka et al. | 303/100 |

FOREIGN PATENT DOCUMENTS

| | | |
|---|---|---|
| 1-202566 | 8/1989 | Japan . |
| 2169675A | 7/1986 | United Kingdom . |

*Primary Examiner*—Robert J. Oberleitner
*Assistant Examiner*—Lee W. Young
*Attorney, Agent, or Firm*—Armstrong, Westerman, Hattori, McLeland & Naughton

[57] ABSTRACT

An anti-lock control method for a vehicle includes the steps of: calculating an operation control quantity on the basis of a braking pressure at the start of an anti-lock control when a wheel is about to be locked during braking, and controlling the operation of an actuator, capable of adjusting the braking force of a wheel brake by the operation control quantity in order to reduce the braking force. In this process, the braking pressure at the start of anti-lock control is corrected with the locking tendency of the wheel to set an adjusted reference braking pressure, and the operation control quantity is calculated on the basis of the adjusted reference braking pressure. Thus, it is possible to determine the reference braking pressure with good accuracy, leading to an enhanced accuracy of the anti-lock control.

3 Claims, 13 Drawing Sheets

Reference braking pressure ($P_{BR}$)

Time lapsed

5,435,634

ANTI-LOCK CONTROL METHOD FOR VEHICLE

BACKGROUND OF THE INVENTION

1. Field of the Invention

The present invention relates to an anti-lock control method for a vehicle comprising the steps of: calculating an operation control quantity on the basis of a braking pressure at the start of an anti-lock control, when a wheel is about to be locked during braking, and controlling the operation of an actuator capable of adjusting the braking force of a wheel brake, by the operation control quantity, to reduce the braking force.

2. Description of the Prior Art

Such anti-lock control processes are already known, for example, from Japanese Patent Application Laid-open No. 202566/89.

In the above prior art method, a braking pressure at the start of the anti-lock control is determined as a reference braking pressure, and an operation control quantity is calculated on the basis of the reference braking pressure. Therefore, because there is a time lag until the braking pressure is converted to a braking force of the wheel brake, the braking pressure may be varied, depending upon a brake operating force, until the braking force is varied by the anti-lock control. This results in a variation in reference braking pressure which does not enhance the accuracy of the anti-lock control.

SUMMARY OF THE INVENTION

It is an object of the present invention to provide an anti-lock control method for a vehicle, wherein the reference braking pressure can be determined with a good accuracy, leading to an enhanced accuracy of anti-lock control.

To achieve the above object, according to the present invention, there is provided an anti-lock control method for a vehicle, comprising the steps of: calculating an operation control quantity on the basis of a braking pressure at the start of an anti-lock control, when a wheel is about to be locked during braking, and controlling the operation of an actuator capable of adjusting the braking force of a wheel brake by the operation control quantity to reduce the braking force, wherein the braking pressure at the start of the anti-lock control is corrected in accordance with a degree of a wheel locking tendency to determine a reference braking pressure, and the operation control quantity is calculated on the basis of the reference braking pressure.

With the above feature of the present invention, even if there is a time lag until the braking pressure is converted to the braking force of the wheel brake, it is possible to avoid variation in reference braking pressure and enhance control accuracy.

The actuator may be an electric actuator in which the braking pressure corresponds to a quantity of electricity applied to the actuator, and the braking pressure, at the start of the anti-lock control, may be presumed on the basis of the quantity of electricity applied to the actuator. Thus, the need for a sensor for detecting the braking pressure at the start of the anti-lock control can be eliminated and reduces the number of parts.

Further, a demand value of the braking pressure may be determined in accordance with the brake operating force, and lower one of the operation control quantity, calculated on the basis of the reference braking pressure and the demand value of braking pressure, may be selected as an operation control quantity for the actuator.

With such a feature, when a driver of a vehicle has reduced the brake operating force during execution of the anti-lock control, a control meeting the will of the driver can be performed by controlling the braking force on the basis of the demand value of braking pressure, determined in accordance with the brake operating force, if such demand value is low.

The above and other objects, features and advantages of the invention will become apparent from a consideration of the following description of the preferred embodiment taken in conjunction with the accompanying drawings.

DESCRIPTION OF THE PREFERRED EMBODIMENT

The present invention will now be described by way of the preferred embodiment in connection with the accompanying drawings.

Figure 1:
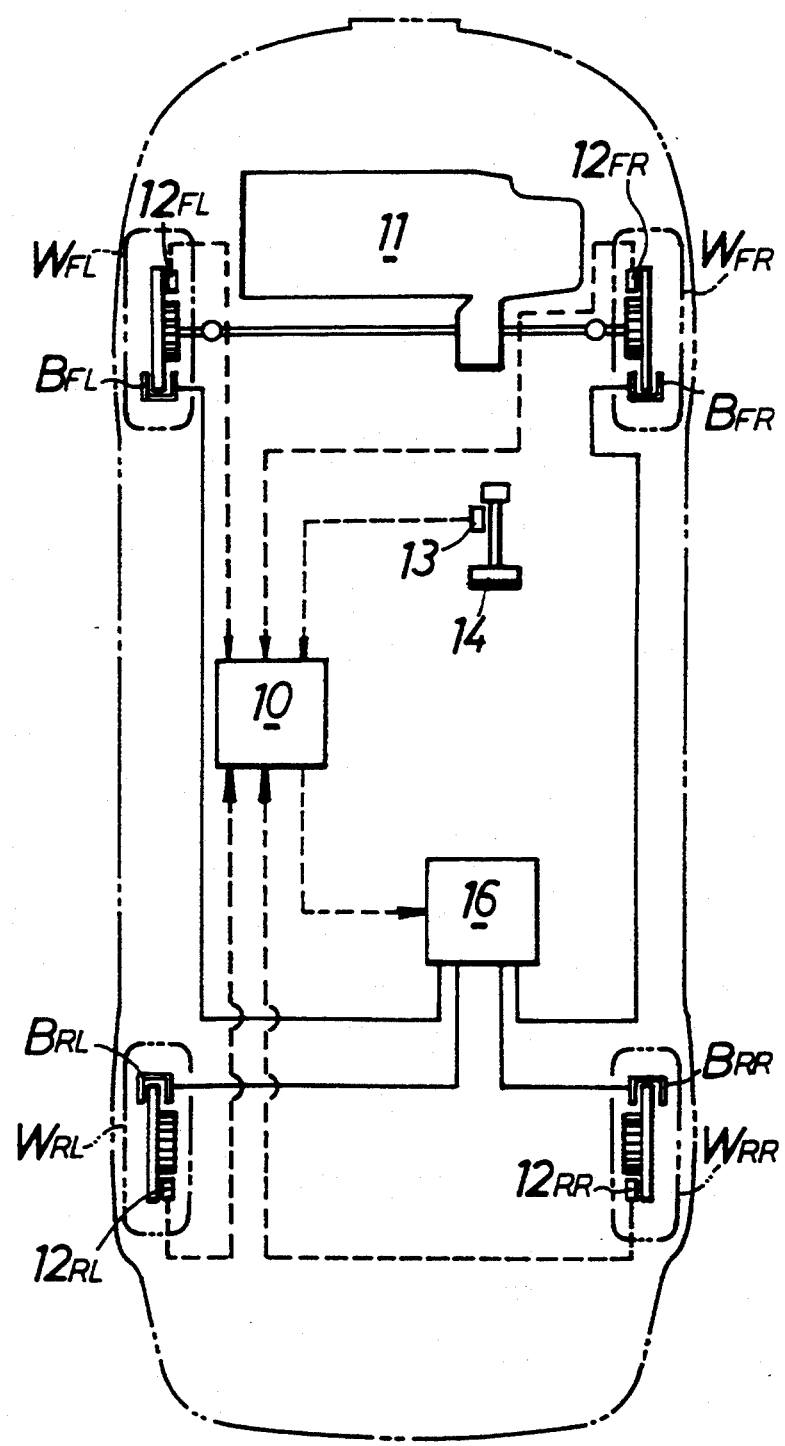
FIG. 1 is an illustration of a braking system for a vehicle in which a process according to a preferred embodiment of the present invention is employed.

Referring first to FIG. 1, a power from a power unit 11, including an engine and a transmission, is transmitted to left and right front wheels $W_{FL}$ and $W_{FR}$ which are driving wheels. Wheel brakes $B_{FL}$ and $B_{FR}$ are mounted on the front wheels $W_{FL}$ and $W_{FR}$, and wheel speed detectors $12_{FL}$ and $12_{FR}$ are associated with the front wheels $W_{FL}$ AND $W_{FR}$. In addition, wheel brakes $B_{RL}$ and $B_{RR}$ are mounted on left and right rear wheels $W_{RL}$ and $W_{RR}$, and wheel speed detectors $12_{RL}$ and $12_{RR}$ are associated with the rear wheels $W_{RL}$ and $W_{RR}$. A braking fluid pressure is applied from a braking fluid pressure circuit 16 to the wheel brakes $B_{FL}$, $B_{FR}$, $B_{RL}$ and $B_{RR}$.

Figure 2:
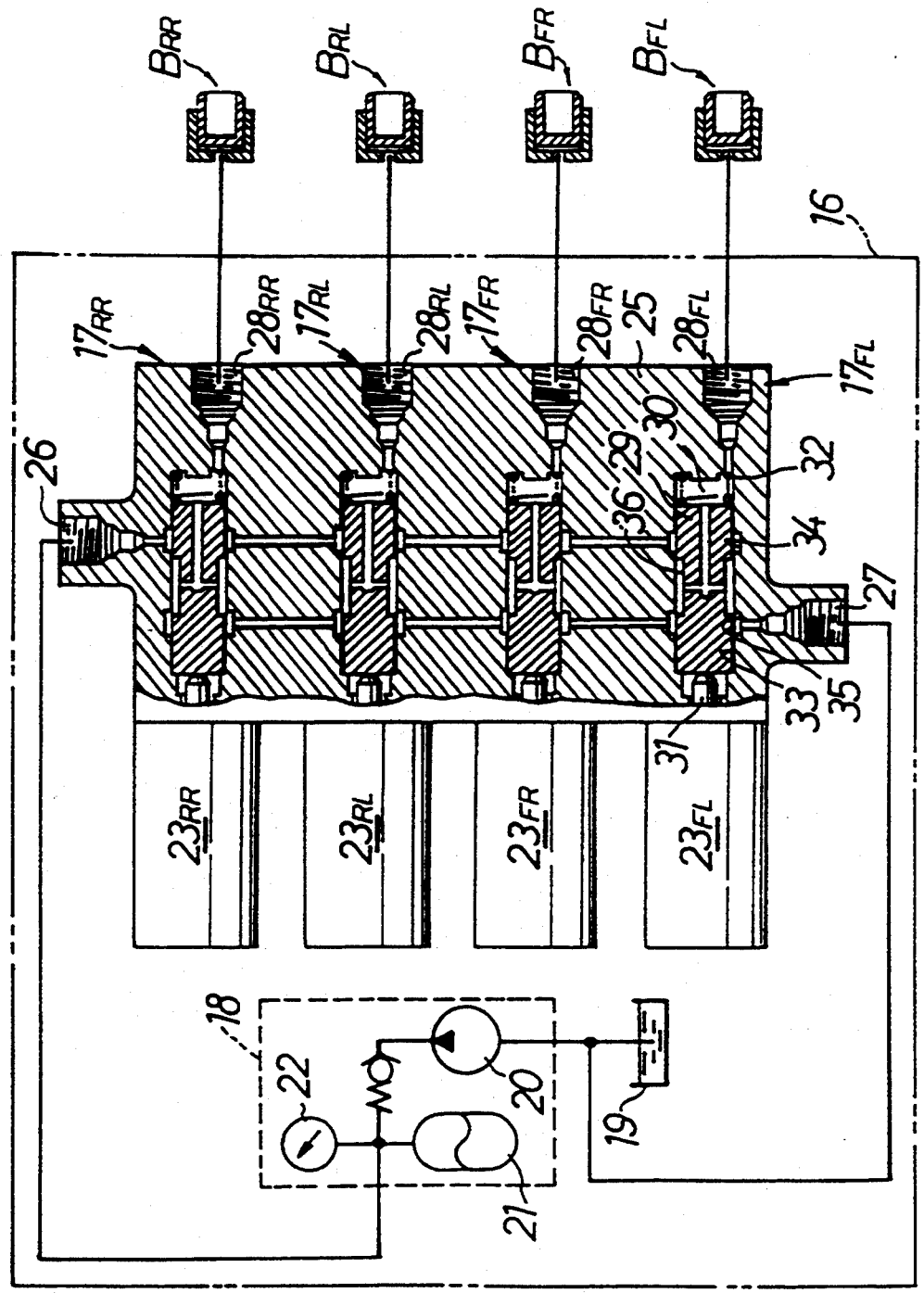
FIG. 2 is an illustration of the arrangement of a braking fluid pressure circuit.

Referring to FIG. 2, the braking fluid pressure circuit 16 includes a modulator $17_{FL}$ serving as an actuator capable of adjusting the braking force of the left front wheel $B_{FL}$, a modulator $17_{FR}$ serving as an actuator capable of adjusting the braking force of the right front wheel $B_{FR}$, a modulator $17_{RL}$ serving as an actuator capable of adjusting the braking force of the left rear wheel $B_{RL}$, a modulator $17_{RR}$ serving as an actuator capable of adjusting the braking force of the right rear wheel $B_{RR}$, and a fluid pressure source 18 common to the modulators $17_{FL}$, $17_{FR}$, $17_{RL}$ and $17_{RR}$.

The fluid pressure source 18 includes a fluid pump 20 for pumping a working fluid from a working fluid tank 19, an accumulator 21 connected to the fluid pump 20, and a pressure switch 22 for controlling the operation of the fluid pump 20.

The modulators $17_{FL}$, $17_{FR}$, $17_{RL}$, and $17_{RR}$ are disposed side by side and in parallel to each other in a common housing 25. Because these modulators have basically the same construction, only the modulator $17_{FL}$ will be described in detail hereinafter, and the detailed description of the other modulators $17_{FR}$, $17_{RL}$ and $17_{RR}$ are omitted. The housing 25 is provided with an input port 26 connected to the fluid pressure source 18, a release port 27 leading to the working fluid tank 19, and four output ports $28_{FL}$, $28_{FR}$, $28_{RL}$ and $28_{RR}$ independently connected to the brakes $B_{FL}$, $B_{FR}$, $B_{RL}$ and $B_{RR}$, respectively.

The modulator $17_{FL}$ includes a spool 29, slidably received in the housing 25, and a linear solenoid $23_{FL}$, mounted to the housing 25, for urging the spool 29 in its axial direction. The linear solenoid $23_{FL}$, has a driving rod 31, coaxially abutting against one end of the spool 29. An output chamber 30 is defined in the housing 25, with the other end face of the spool 29 facing the output chamber 30. The output chamber 30 leads to the output port $28_{FL}$. A return spring 32 is accommodated in the output chamber 30 and biases the spool 29 toward linear solenoid $23_{FL}$. Thus, the spool 29 normally abuts against the driving rod 31 under a spring force of the return spring 32 and is operatively connected to the linear solenoid $23_{FL}$.

The housing 25 is provided with a cylinder bore 33 in which the spool 29 is slidably received. An annular groove 34, leading to the input port 26, and an annular groove 35 leading to the release port 27, are provided in an inner surface of the cylinder bore 33 at axially spaced-apart locations. An annular recess 36, normally leading to the output chamber 30, is proved in an outer surface of the spool 29. The spool 29 is switched over between a state in which the annular recess 36 communicates with the annular groove 34 so as to connect input port 26 and output chamber 30, connecting output port $28_{FL}$ and input port 26 with each other, and a state in which the annular recess 36 communicates with groove 35 so as to connect output chamber 30 and release port 27 with each other, in accordance with change in axial position of spool 29 by relation of the strength between a trust force of the linear solenoid $23_{FL}$, acting on an axially one end of spool 29 and fluid pressure force in the output chamber 30 acting on the other end of spool 29.

Linear solenoid $23_{FL}$ generates a thrust force according to the electricity applied thereto. Hence, the fluid pressure in the output chamber 30, i.e., the fluid pressure applied through the output port $28_{FL}$ to the left front wheel brake $B_{FL}$, can be controlled to any level by controlling the electricity energizing the linear solenoid $23_{FL}$.

In the modulators $17_{FR}$, $17_{RL}$ and $17_{RR}$, the fluid pressure acting on the wheel brakes $B_{FR}$, $B_{RL}$ and $B_{RR}$ can be controlled by controlling the electricity energizing the linear solenoids $23_{FR}$, $23_{RL}$ and $23_{RR}$, as in the modulator $17_{FL}$.

Referring again to FIG. 1, the wheel speed detectors $12_{FL}$, $12_{FR}$, $12_{RL}$ and $12_{RR}$ and a brake-operating force detector 13 for detecting a depression force acting on a brake pedal 14, i.e., a brake-operating force, are connected to a control unit 10 for performing anti-lock control. In such anti-lock control, the electricity for energizing the linear solenoids $23_{FL}$, $23_{FR}$, $23_{RL}$ and $23_{RR}$ in the modulators $17_{FL}$, $17_{FR}$, $17_{RL}$ and $17_{RR}$ is controlled by the control unit 10. The construction of the control unit 10 will be described below.

Figure 3:
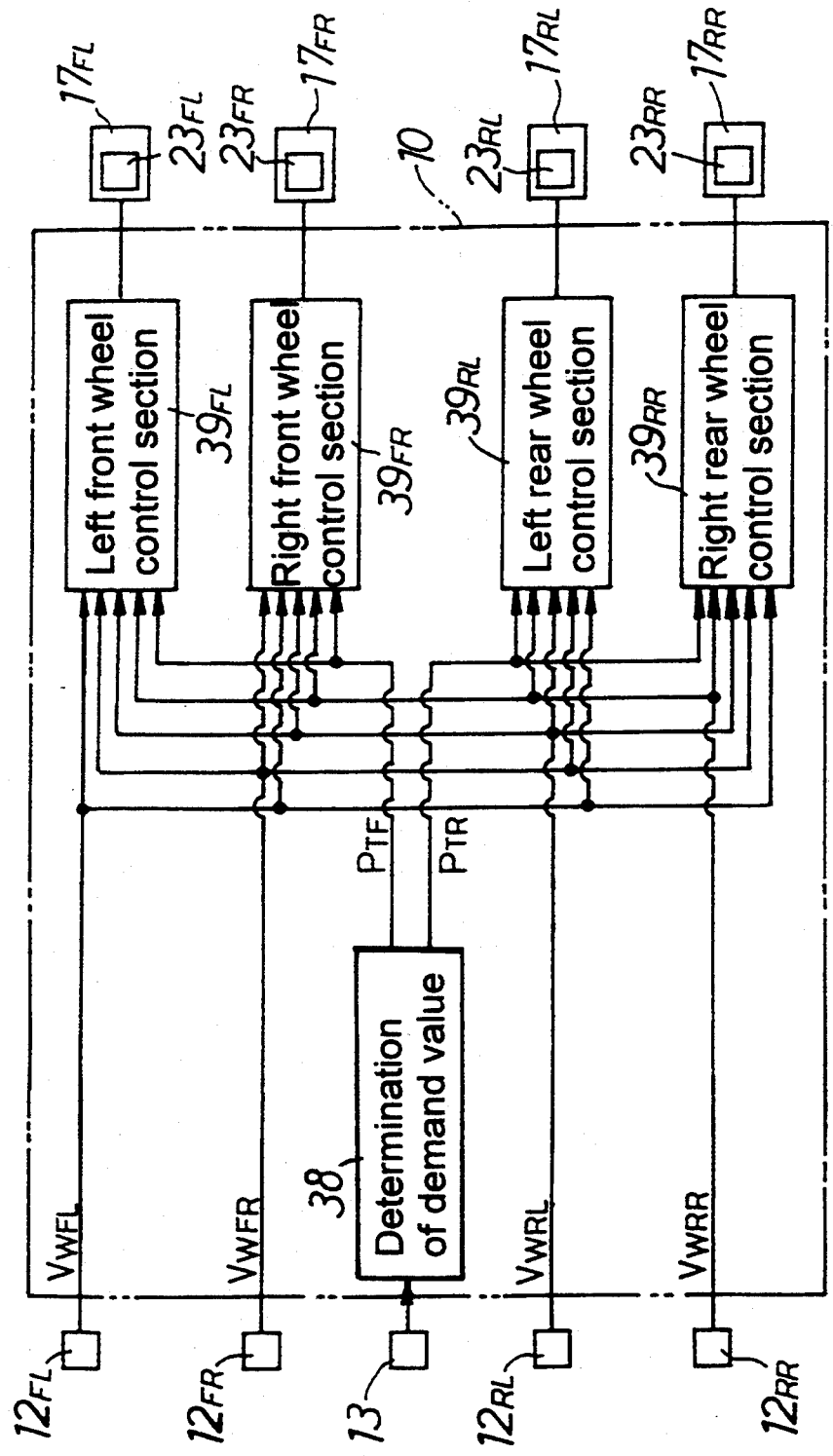
FIG. 3 is a block diagram illustrating the arrangement of a control unit.

Referring to FIG. 3, the control unit 10 for performing the anti-lock control includes a demand value determination means 38 for determining a braking pressure demand value $P_{TF}$ for the front wheels and a braking pressure demand value $P_{TR}$ for the rear wheels in accordance with a value detected by the brake-operating force detector 13; a left front wheel control section $39_{FL}$ and a right front wheel control section $39_{FR}$ for independently controlling the operations of the linear solenoids $23_{FL}$ and $23_{FR}$ on the basis of a left front wheel speed $V_{WFL}$ detected by the left front wheel speed detector $12_{FL}$, a right front wheel speed $V_{WFR}$ detected by the right front wheel speed detector $12_{FR}$, a left rear wheel speed $V_{WRL}$ detected by the left rear wheel speed detector $12_{RL}$, a left rear wheel speed $V_{WRR}$ detected by the left rear wheel speed detector $12_{RR}$, and the front wheel braking pressure demand value $P_{TF}$ determined in the demand value determination means 38; and a left rear wheel control section $39_{RL}$ and a right rear wheel control section $39_{RR}$ for independently controlling the operations of the linear solenoids $23_{RL}$ and $23_{RR}$ on the basis of the wheel speeds $V_{WFL}$, $V_{WFR}$, $V_{WRL}$ and $V_{WRR}$ and the rear wheel braking pressure demand value $P_{TR}$.

Figure 4:
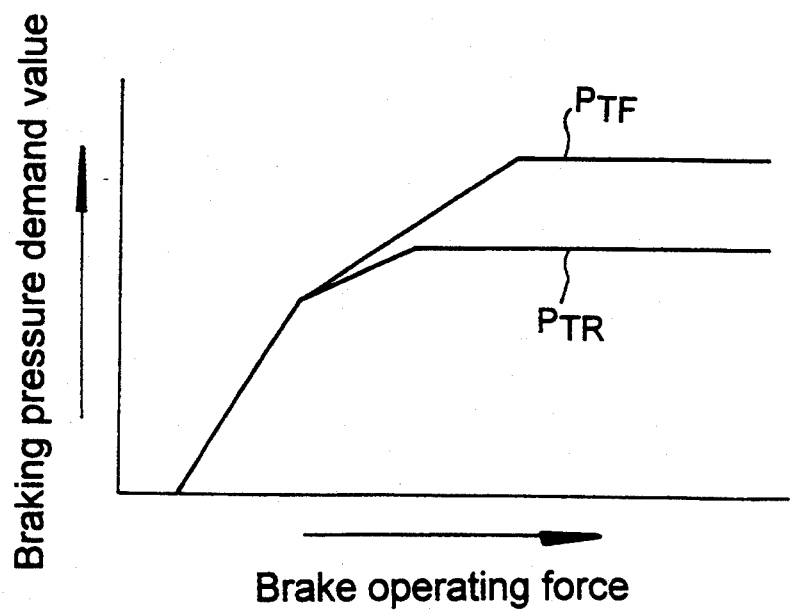
FIG. 4 is a diagram illustrating the present demand value of braking pressure.

In the demand value determination means 38, the front and rear wheel braking pressure demand values $P_{TF}$ and $P_{TR}$ in accordance with the brake-operating force are previously determined, as shown in FIG. 4. The rear wheel braking pressure demand value $P_{TR}$ is determined at a lower level than the front wheel braking pressure demand value $P_{TF}$ after a given brake-operating force.

The left front wheel control section $39_{FL}$, the right front wheel control section $39_{FR}$, the left rear wheel control section $39_{RL}$ and the right rear wheel control section $39_{RR}$ basically have the same construction. Therefore, the construction of the left front wheel control section $39_{FL}$ will be described hereinafter.

Figure 5:
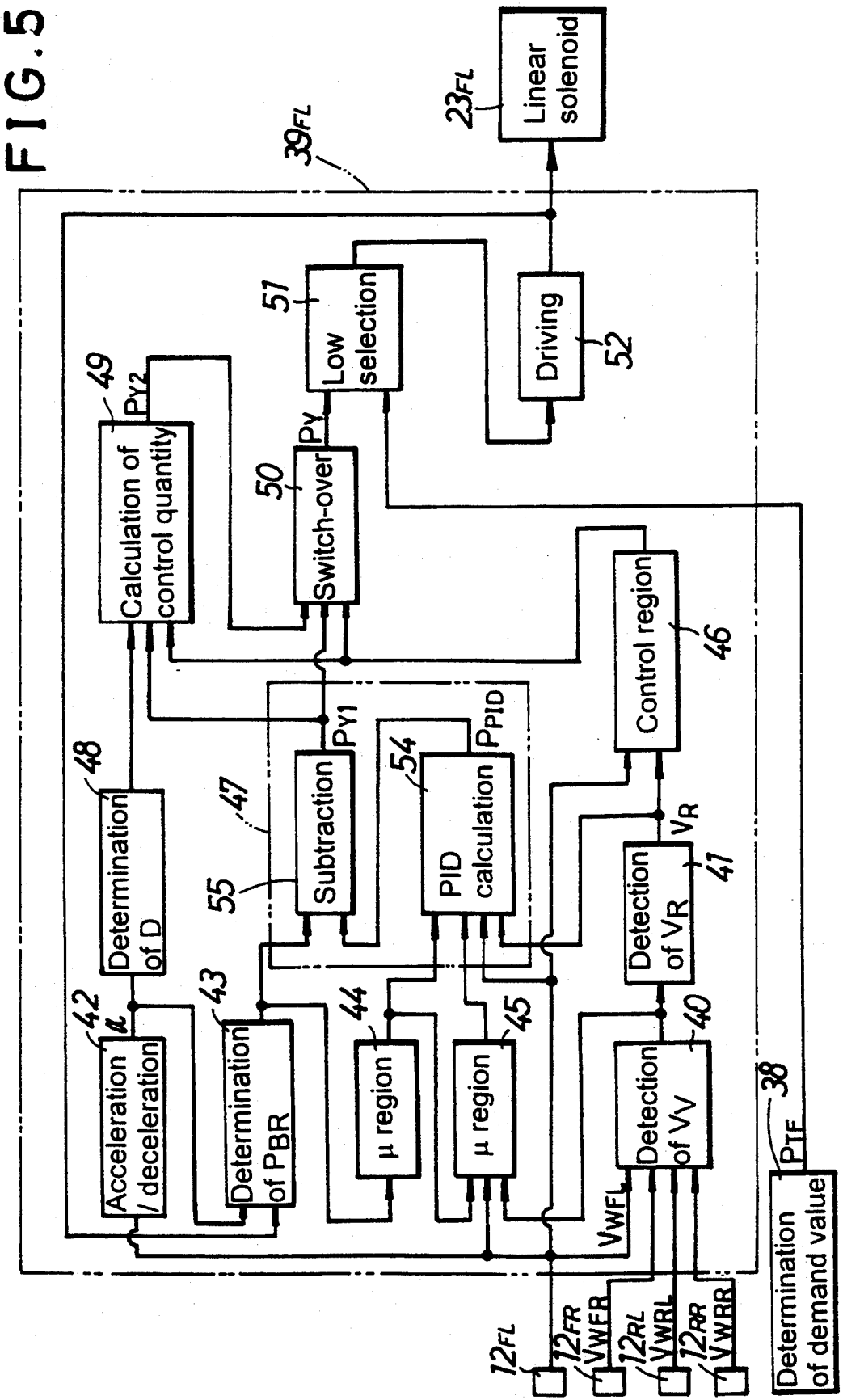
FIG. 5 is a block diagram illustrating the arrangement of a left front wheel control section.

Referring to FIG. 5, the left wheel control section $39_{FL}$ includes a vehicle speed detecting means 40 for detecting a vehicle seed $V_V$ on the basis of the wheel speeds $V_{WFL}$, $V_{WFR}$, $V_{WRL}$ and $V_{WRR}$; a target wheel speed determination means 41 for determining a target wheel speed $V_R$ in consideration of a predetermined slip rate in addition to the vehicle speed $V_V$; an acceleration/deceleration calculating means 42 for differentiating the left front wheel speed $V_{WFL}$ to provide a wheel acceleration/deceleration $\alpha$; a reference braking pressure determination means 43 for determining a reference braking pressure $P_{BR}$ by correcting the braking pressure at the start of the anti-lock control in accordance with the wheel acceleration/deceleration $\alpha$ as an index representative of a wheel locking tendency; a first friction coefficient region deciding means 44 for deciding a friction coefficient region of a road surface at the start of the anti-lock control; a second friction coefficient region deciding means 45 for deciding a friction coefficient region of the road surface during continuance of the anti-lock control; a control region deciding means 46 for deciding a control region on the basis of the target wheel speed $V_R$ and the left front wheel speed $V_{FL}$; a first control quantity calculating means 47 for determining an operation control quantity $P_{Y1}$ on the basis of the left front wheel speed $V_{WFL}$, the reference braking pressure $P_{BR}$, results of decision in the first and second friction coefficient region deciding means 44 and 45 and the target wheel speed $V_R$; a correction value determination means 48 for determining a correction value D on the basis of the wheel acceleration/deceleration $\alpha$; a second control quantity calculating means 49 for determining an operation control quantity $P_{Y2}$ in accordance with the correction value D, the operation control quantity $P_{Y1}$ obtained by the first control quantity calculating means 47 and a result of decision in the control region deciding means 46; a switch-over means 50 for selecting one of the operation control quantities $P_{Y1}$ and $P_{Y2}$ determined respectively in the first and second control quantity calculating means 47 and 49 in accordance with a result of decision by the control region deciding means 46 so as to output the same as a control quantity $P_Y$; a low selection means 51 for alternatively selecting lower one of the control quantity $P_Y$ from the switch-over means 50 and the demand value $P_{TF}$ from the demand value determination means 38; and a driving means 52 for driving the linear solenoid $23_{FL}$ on the basis of the control quantity determined in the low selection means 51.

The highest value among the wheel speeds $V_{WFL}$ to $V_{WRR}$ detected by the wheel speed detectors $12_{FL}$ to $12_{RR}$ is defined as the outermost wheel speed during turning of the vehicle. This outermost wheel speed is corrected, while taking account of the turning movement of the vehicle, so as to reduce the difference in inner and outer speeds between the outermost wheel speed and the left front wheel speed $V_{WFL}$ which is a subject wheel speed. In the vehicle speed detecting means 40, higher one of the above described corrected speed and the wheel speed $V_{WFL}$, detected by the left front speed detector $12_{FL}$, is presumed as a vehicle speed $V_V$. Therefore, even if there is a tendency for the subject wheel, i.e., the left front wheel, to be reduced due to a locking tendency produced in the subject wheel, the accuracy of the presumption of the vehicle speed, during the anti-lock control, can be enhanced by using, as a presumed vehicle speed $V_V$ a speed of a wheel having a non-locking tendency, other than the subject wheel, and which is corrected while taking into consideration a turning movement of the vehicle.

Figure 6:
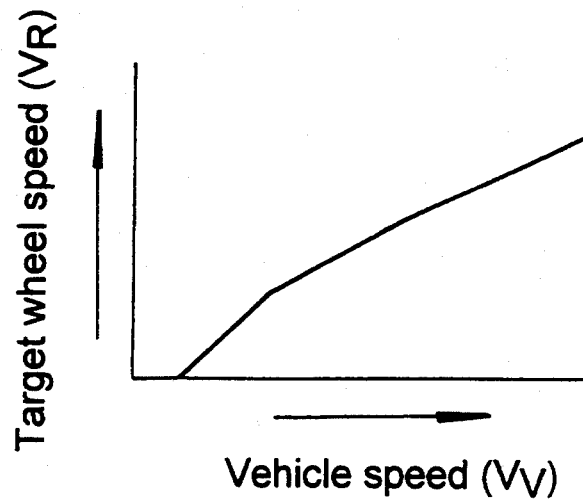
FIG. 6 is a graph illustrating the preset value of target wheel speed.

In the target wheel speed determination means 41, a target wheel speed $V_R$ is determined, as shown in FIG. 6, by taking a predetermined slip rate into consideration in addition to the vehicle speed $V_V$ determined in the vehicle speed detecting means 40. In the acceleration/deceleration calculating means 42, a wheel acceleration/deceleration $\alpha$ is determined by differentiating the wheel speed $V_{WFL}$ detected by the left front wheel detector $12_{FL}$.

Figure 7:
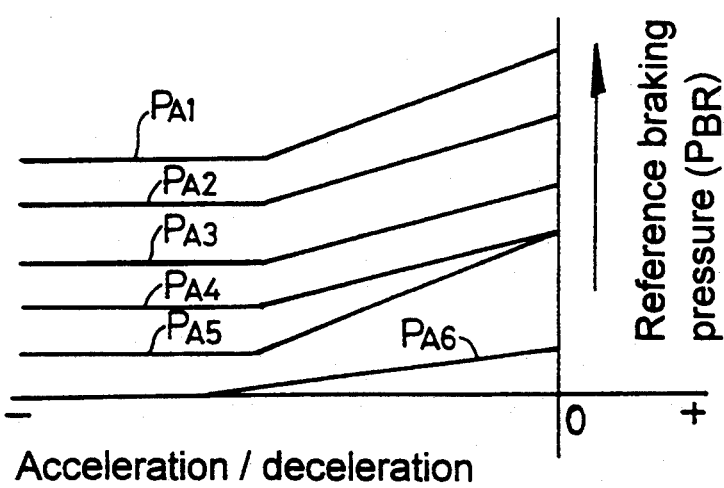
FIG. 7 is a graph illustrating a preset map of reference braking pressure.

The reference braking pressure determination means 43 determines a reference braking pressure $P_{BR}$ by correcting the braking pressure, at the start of the anti lock control, in accordance with the current wheel acceleration/deceleration $\alpha$. The wheel acceleration/deceleration $\alpha$ determined in the acceleration/deceleration calculating means 42, and an output signal from the driving means 52, as a signal representative of the braking pressure at the start of the anti-lock control, are supplied to the reference braking pressure determination means 43. Reference braking pressures $P_{BR}$, corresponding to a plurality of braking pressures $P_{A1}$ to $P_{A6}$, have been previously determined in accordance with the wheel acceleration/deceleration $\alpha$, a shown in FIG. 7, and the reference braking pressure $P_{BR}$, at the start of the anti-lock control, is outputted from the reference braking pressure determination means 43.

Figure 8:
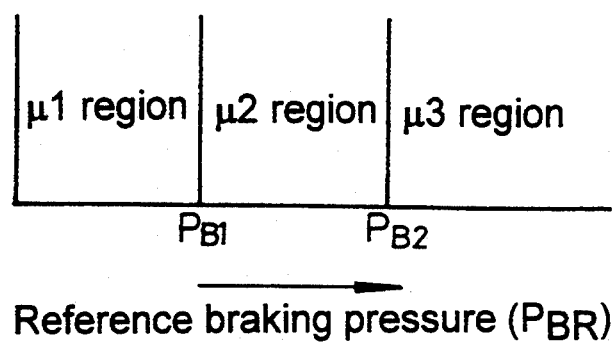
FIG. 8 is a diagram illustrating a map for decision of friction coefficient regions.

There are a plurality of friction coefficient regions, previously established in accordance with the reference braking pressure $P_{BR}$, at the start of the anti-lock control, the first friction coefficient deciding means 44 decides in which region the friction coefficient exists. As shown in FIG. 8, following three regions have been previously established: a $\mu 1$ region which is a low friction coefficient region when $P_{BR} \leq P_{B1}$, a $\mu 2$ region which is a medium friction coefficient region when $P_{B1} < P_{BR} \leq P_{B2}$, and a $\mu 3$ region, which is a high friction coefficient region when $P_{B2} < P_{BR}$. It is decided in which region the friction coefficient exists, in accordance with the reference braking pressure $P_{BR}$. A result of such decision is outputted from the first friction coefficient decision means 44.

The second friction coefficient decision means 45 decides the friction coefficient region of the road surface during continuance of the anti-lock control, on the basis of the vehicle speed $V_V$, and the left front wheel speed $V_{WFL}$, and a result of the decision in the first friction coefficient decision means 44. The friction coefficient region, determined at the start of the anti-lock control, can be changed on the basis of a period of time which the wheel speed $V_{WFL}$ is exceeding a friction coefficient decision speed $V_M$, determined on the basis of the vehicle speed $V_V$. The friction coefficient decision speed $V_M$ is set, for example, at a value resulting from substraction of 10 km/hr from the vehicle speed $V_V$. The counting of the time is started when $V_{WFL} > V_M$ and completed when $V_M \geq V_{WFL}$.

In the decision of the friction coefficient region by the counting of the time, three decision count values $T_{M1}$, $T_{M2}$ and $T_{M3}$ ($T_{M1} < T_{M2} < T_{M3}$) have been set. When a time count value T is less than $T_{M1}$ ($T < T_{M1}$), it is decided that the friction coefficient is in the lower friction coefficient region. More specifically, when the friction is in the $\mu 2$ region, it is decided that the friction coefficient is in the $\mu 1$ region; when the friction coefficient is in the $\mu 3$ region, it is decided that the friction coefficient is in the $\mu 2$ region; and when the friction coefficient is in the $\mu 1$ region, it is decided that the friction coefficient remains in the $\mu 1$ region.

When the time count value T is equal to, or more than, $T_{M1}$ and less than $T_{M2}$ ($T_{M1} \leq T < T_{M2}$), it is decided that the friction coefficient ramains in the previous region. More specifically, the previous decision, that the friction coefficient was in the $\mu 1$, $\mu 2$ or $\mu 3$ region, is maintained.

When the time count value T is equal to, or more than, $T_{M2}$ and less that $T_{M3}$ ($T_{M1} \leq T < T_{M3}$), it is decided that the friction coefficient is in the higher friction coefficient region. More specifically, when the friction coefficient is in the $\mu 1$ region, it is decided that the friction coefficient is in the $\mu 2$ region; when the friction coefficient is in the $\mu 2$ region, it is decided that the friction coefficient is in the $\mu 3$ region, and when friction coefficient is in the $\mu 3$ region, it is decided that the friction coefficient remains in the $\mu 3$ region.

Further, when the time count value T is equal to, or more than, $T_{M3}$ ($T_{M3} \leq T$), it is decided that the friction coefficient is in the high friction coefficient region, i.e., in the $\mu 3$ region.

Figure 9:
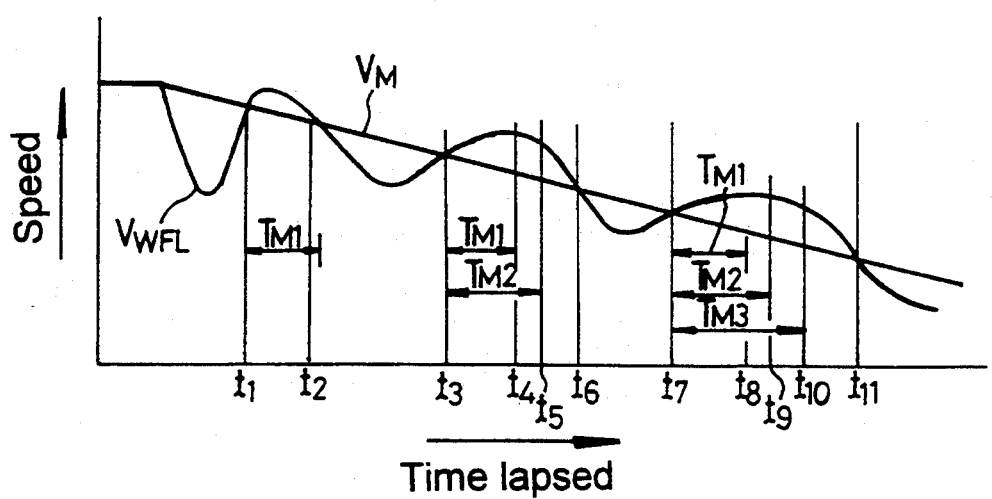
FIG. 9 is a diagram for explaining a procedure of decision of each friction coefficient region during continuation of the anti-lock control

When the wheel speed $V_{WFL}$ is changed, as shown in FIG. 9, the counting of time is started at each of time points $t_1$, $t_3$ and $t_7$ and is completed at each of time points $t_2$, $t_6$ and $t_{11}$. At the count completion time point $t_2$, where the time count value T is less than $T_{M1}$, it is decided that the friction coefficient is in the lower friction coefficient region. At time points $t_4$ and $t_8$, when the time count value T becomes equal to, or more than, $T_{M1}$, the previous friction coefficient region is maintained. At time points $t_5$, and $t_9$, when the time count value T becomes equal to or more than $T_{M2}$, it is decided that the friction coefficient is in the higher friction coefficient region. At a time point $t_{10}$, when the time count value T becomes equal to, or more than, $T_{M3}$, it is decided that the friction coefficient is in the high friction coefficient region.

Figure 10:
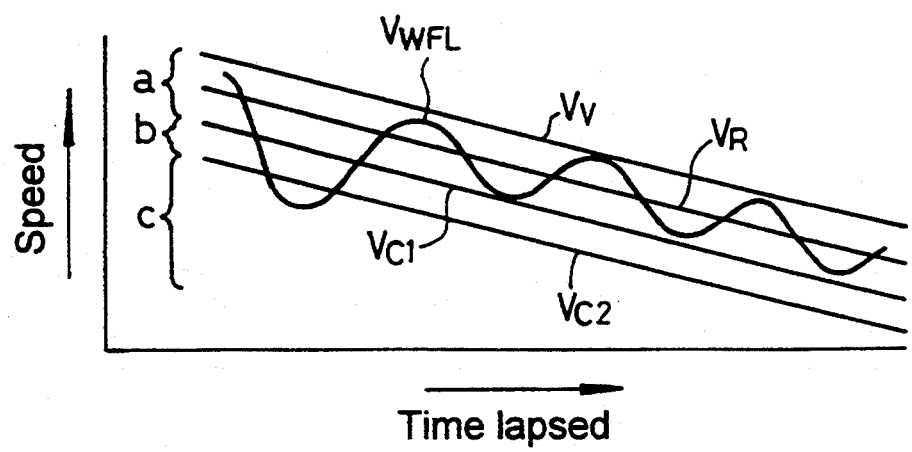
FIG. 10 is a diagram for explaining conditions for decision of each control region.

The control region decision means 46 decides a control region on the basis of the target wheel speed $V_R$, determined in the target wheel speed determination means 41, and the left front wheel speed $V_{FL}$, detected by the left front wheel speed detector $12_{FL}$. First and second decision reference wheel speeds $V_{C1}$ and $V_{C2}$ have been previously set, as shown in FIG. 10. The first decision reference wheel speed $V_{C1}$ is a value resulting from substraction of, for example, 5 km/hr from the target wheel speed $V_R$, and the second decision reference wheel speed $V_{C2}$ is a value resulting from subtraction of, for example, 10 km/hr from the target wheel speed $V_R$. Three control regions a, b and c have been established in the following manner by comparison of the left front wheel speed $V_{FL}$ with the first and second decision reference wheel speeds $V_{C1}$ and $V_{C2}$:

Control region a: $V_{WFL} > V_{C1}$

Control region b: $V_{C1} \geq V_{WFL} > V_{C2}$

Control region c: $V_{WFL} < V_{C2}$

Such control regions a, b and c have been established in accordance with the degree of deviation of the left front wheel speed $V_{WFL}$ from the target wheel speed $V_R$. The control region a has been established as a region in which the left front wheel speed $V_{WFL}$ is relatively near the target wheel speed $V_R$. The control region b has been established as a region in which the left front wheel speed $V_{WFL}$ is remote from the target wheel speed $V_R$. The control region c has been established as a region in which the left front wheel speed $V_{WFL}$ is further remote from the target wheel speed $V_R$.

The first control quantity calculating means 47 includes a PID calculating circuit 54 and a subtracting circuit 55. The PID calculating circuit 54 calculates a PID control quantity $P_{PID}$ on the basis of results of decision in the first and second friction coefficient region deciding means 44 and 45, the left front wheel speed $V_{WFL}$ and the target wheel speed $V_R$. The subtracting circuit 55 subtracts the PID control quantity $P_{PID}$ from the reference braking pressure $P_{BR}$ to provide an operation control quantity.

In the PID calculating circuit 54, the PID control quantity $P_{PID}$ is calculated according to a following equation: (1):

$$P_{PID(k)} = K_P \times P_{(k)} + K_I \times I_{(k)} + K_D \times D_{(k)} \qquad (1)$$

wherein
$P_{(k)} = V_{WFL(k)} - V_{R(k)}$
$I_{(k)} = P_{(k)} - I_{(k-1)}$ and
$D_{(k)} = P_{(k)} - P_{(k-1)}$.

A suffix (k) indicates a current or now value, and a suffix (k−1) indicates a value which is obtained the last time. Each of $K_P$, $K_I$ and $K_D$ is a gain constant, determined as given in Table 1, for every friction coefficient region. Moreover, when the control region, other than the control region a, i.e., the control region b or c, is decided by the control region deciding means 46, $P_{(k)}$ and $D_{(k)}$ are cleared, and $I_{(k)}$ is held to provide for the PID control in the next control region a.

TABLE 1

|  | $\mu 1$ region | $\mu 2$ region | $\mu 3$ region |
| --- | --- | --- | --- |
| $K_P$ | 0.45 | 0.45 | 0.45 |
| $K_I$ | 0.03 | 0.06 | 0.1 |
| $K_D$ | 0.1 | 0.1 | 0.1 |

In the subtracting circuit 55, a calculation $(P_{Y1} = P_{BR}(k) - P_{PID(k)})$ is carried out. An operation control quantity $P_{Y1}$ is supplied to the switch-over means 50 from the subtracting circuit 55.

Figure 11:
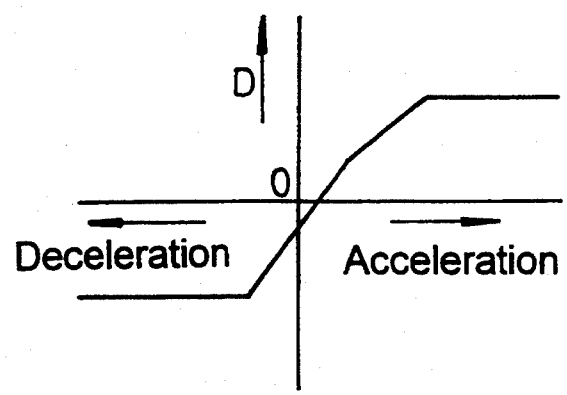
FIG. 11 is a diagram illustrating the preset correction value according to the wheel acceleration/deceleration.

In the correction value determination means 48, a correction value D, previously set as shown in FIG. 11, is determined in accordance with the wheel acceleration/deceleration $\alpha$ determined in the acceleration/deceleration calculating means 42.

When the control region b or c is decided by the control region deciding means 46, a following calculation is carried out in the second control quantity calculating means 49 in accordance with the control region b or c:

Control region b: $P_{Y2} = P_{10} - D_{I(k)}$ control region c: $P_{Y2} = P_{20} - D_{I(k)}$ wherein $P_{10}$ is a final control quantity in the control region a, when the control is moved from the control region a to the control region b, and $P_{20}$ is a final control quantity in the control region b, when the control is moved from the control region b to the control region c. In addition, $D_{I(k)}$ is equal to $D_{(k)} + D_{I(k-1)}$ (i.e., $D_{I(k)} = D_{(k)} + D_{(k-1)}$) and is an integration value derived from the correction value D. Further, when the movement between the control regions b and c occurs, $D_{I(k)}$ is cleared.

The operation control quantity $P_{Y2}$, determined in the second control quantity calculating means 49, is supplied to the switch-over means 50, along with the operation control quantity $P_{Y1}$ determined in the first control quantity calculating means 47. The switch-over means 50 selects the operation control quantity $P_{Y1}$ from the first control quantity calculating means 47 as an operation control quantity $P_Y$, when the result of decision in the control region deciding means 46 indicates the control region a, and selects the operation control quantity $P_{Y2}$ from the second control quantity calculating means 49 as the operation control quantity $P_Y$, when the result of decision in the control region deciding means 46 indicates the control region b or c.

The control quantity $P_Y$, from the switch-over means 50, and the demand value $P_{TF}$, from the demand value determination means 38, are supplied to the low selection means 51. The low selection means 51 alternatively selects lower one of $P_Y$ and $P_{TF}$ to apply it to the driving means 52. The driving means 52 drives the linear solenoid $23_{FL}$ on the basis of the control quantity selected in the low selection means 51.

The linear solenoid $23_{FL}$, driven by the driving means 52, exhibits a thrust corresponding to a quantity of electricity supplied thereto, thereby controlling the braking pressure to a value corresponding to the quantity of electricity supplied. An output signal, from the driving means 52, corresponds to the braking pressure.

The operation of this embodiment will be described below. In the control region deciding means 46, the control regions, (i.e., the control region a in which the front wheel speed $V_{WFL}$ is relatively near the target wheel speed $V_R$, the control region b, in which the front wheel speed $V_{WFL}$ is relatively remote from the target wheel speed $V_R$, and the control region c, in which the front wheel speed $V_{WFL}$ is further remote from the target wheel speed $V_R$), are decided by comparison of the first and second decision reference wheel speeds $V_{C1}$ and $V_{C2}$, determined on the basis of the target wheel speed $V_R$ with the speed $V_{WFL}$ of the left front wheel $W_{FL}$, which is a subject wheel. In the control region a, the control, based on the operation control quantity $P_{Y1}$ determined by the PID calculation in the first control quantity calculating means 47, is carried out, and in the control region b or c, the control, based on the operation control quantity $P_{Y2}$ determined in the second control quantity calculating means 49 on the basis of the wheel acceleration/deceleration $\alpha$ is carried out. Thus, when the deviation between the wheel speed $V_{WFL}$ and the target wheel speed $V_R$ becomes large, the control, based on the operation control quantity $P_{Y2}$ determined on the basis of the wheel acceleration/deceleration $\alpha$, is carried out. This enables the wheel speed $V_{WFL}$ to be promptly converged to the target wheel speed $V_R$, leading to an enhanced responsiveness.

Moreover, in the control regions b and c in which the wheel speed $V_{WFL}$ is relatively remote from the target wheel speed $V_R$, the convergence to the target wheel speed $V_R$ is hastened due to the construction such that the reference value is shifted from $P_{10}$ to $P_{20}$, when the control region b is changed to the control region c.

In addition, the PID control is carried out by using, as a reference value, the reference braking pressure $P_{BR}$ obtained by correction of the braking pressure at the start of the anti-lock control by the wheel acceleration/deceleration $\alpha$. Therefore, it is possible to prevent the reference pressure, at the start of the anti-lock control, from being varied depending upon the degree of depression of the brake pedal 14, leading to an enhanced accuracy of the anti-lock control. Moreover, each of the modulators $17_{FL}$ to $17_{RR}$, for adjusting the braking pressure, is an electric actuator, and the braking pressure at the start of the anti-lock control is obtained from the output from the driving means 52. Therefore, a sensor for detecting the braking pressure is not required, which contributes to a reduction in number of parts or components.

It is also considered that a vehicle driver moderates the depression force on the brake pedal 14 during execution of the anti-lock control. In this case, lower one of the operation control quantity $P_Y$ or the demand value $P_{TF}$ or $P_{TR}$, determined in accordance with the quantity of operation of the brake pedal 14, is selected by the low selection means 51 and therefore, even during execution of the anti-lock control, the braking pressure, according to the braking operation, can be obtained.

Further, at the start of the anti-lock control, the gain constants $K_P$, $K_I$ and $K_D$ in the PID calculation are determined on the basis of the result of decision in the first friction coefficient deciding means 44, and during continuation of the anti-lock control, the gain constants $K_P$, $K_I$ and $K_D$ are determined on the basis of the result of decision in the second friction coefficient deciding means 45. Therefore, the calculation of control quantity, accommodating a variation in friction coefficient of a road surface, can be carried out. Moreover, the friction coefficient decision speed $V_M$ is determined on the basis of the vehicle speed $V_V$, and the first and second friction coefficient deciding means 44 and 45 decide a friction coefficient in consideration of a variation in frictional force between the wheel and the road surface with a variation in vehicle speed $V_V$. Therefore, it is possible to prevent the braking distance and the locking tendency from being increased and to provide an anti-lock control of an enhanced accuracy in consideration of the variation in frictional force between the wheel and the road surface.

The processing in the anti-lock control may be carried out by a computer program. A procedure of the processing in the anti-lock control for the left front wheel in such a case will be described with references to FIGS. 12 to 16.

Figure 12:
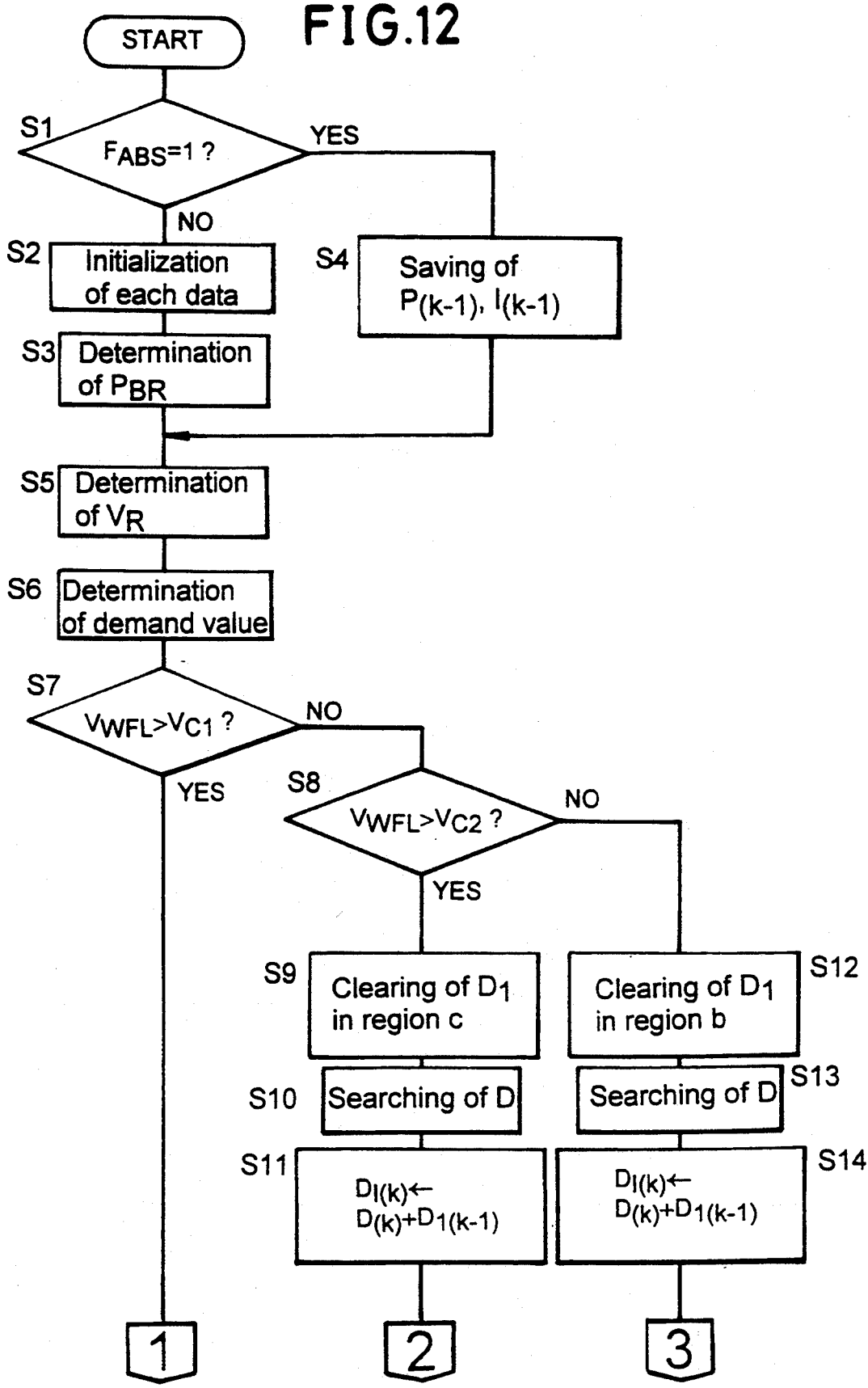
FIGS. 12 and 13 are portions of a flow chart illustrating a main routine of the anti-lock control processing.

Referring first to FIG. 12, it is judged at a first step S1 whether or not a flag $F_{ABS}$ is "1". The flag $F_{ABS}$ indicates whether the anti-lock control is at the start or is being continued. More specifically, "1" indicates that the anti-lock control is being continued, and "0" indicates that the anti-lock control is at the start. If it has been decided that $F_{ABS} \neq 1$, each of data is initialized at a second step S2, and then, a reference braking pressure $P_{BR}$ is determined according to FIG. 7 at a third step S3. On the other hand, if it has been decided at the first step S1 that $F_{ABS}$ = "1", the P and I terms in of last time, the PID calculation are saved at a fourth step S4 bypassing the second and third steps S2 and S3.

At fifth step S5, a target wheel speed $V_R$ is determined according to FIG. 6, and at a sixth step S6, demand values $P_{TF}$ and $P_{TR}$ of braking pressure are determined according to FIG. 4. At a subsequent seventh step S7, it is judged whether or not the wheel speed, e.g., the left front wheel speed $V_{WFL}$ exceeds the first decision reference wheel speed $V_{C1}$, i.e., is in the control region a. If it has been decided that $V_{WFL} > V_{C1}$, processing is advanced to a 15th step S15, FIG. 13, on the assumption that the left front wheel speed $V_{WFL}$ is in the control region a.

On the other hand, if it has been decided at the seventh step S7 that $V_{WFL} \leq V_{C1}$, the processing is advanced to an eighth step S8, FIG. 12, at which it is judged whether or not the wheel speed e.g., the left front wheel speed $V_{WFL}$ exceeds the second decision reference wheel speed $V_{C2}$, i.e., is in the control region b. If it has been decided that $V_{WFL} > V_{C2}$, the processing is advanced to a ninth step S9 on the assumption that the left front wheel speed $V_{WFL}$ is in the control region b. At the ninth step S9, the integration value $D_1$ of the correction value D in the control region c is cleared. At a tenth step S10, the correction value D is searched according to FIG. 11, and at a next step S11, a current integration correction value is calculated according to an equation, $D_{I(k)}=D_{(k)}+D_{I(k-1)}$, the progressing is advanced to a 18th step S18 shown in FIG. 13.

If it has been decided at the eight step S8 that $V_{WFL} \leq V_{C2}$, the processing is advanced to a 12th step S12 on the assumption that the left front wheel speed $V_{WFL}$ is in the control region c. At the 12th step S12, the integration value $D_I$ of the correction value D in the control value D is searched according to FIG. 11. At a next 14th step S14, a current integration correction value is calculated according to an equation, $D_{I(k)}=D_{(k)}+D_{I(k-1)}$, and the progressing is advanced to a 21th step S21 shown in FIG. 13.

Figure 13:
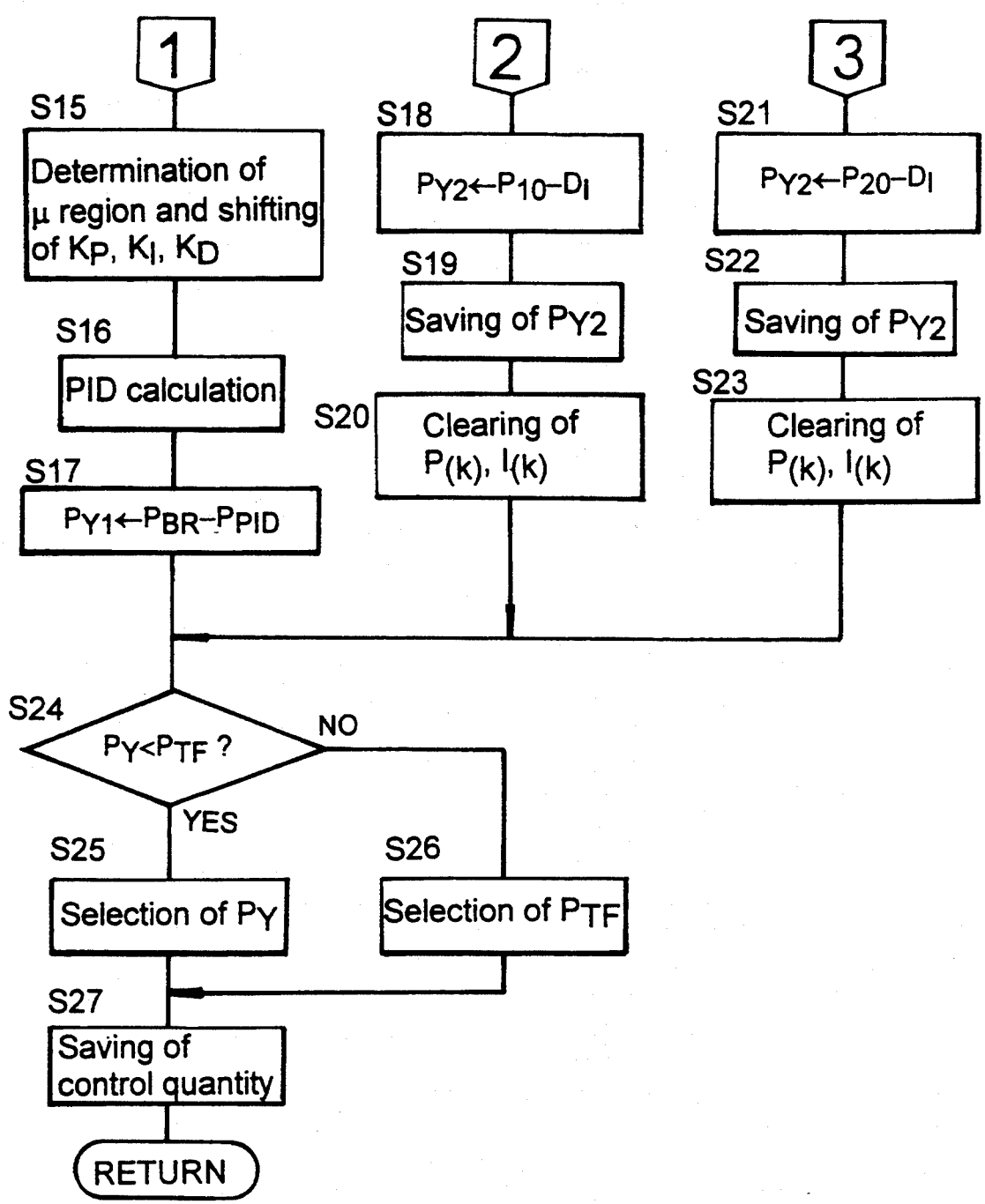
Figure 14:
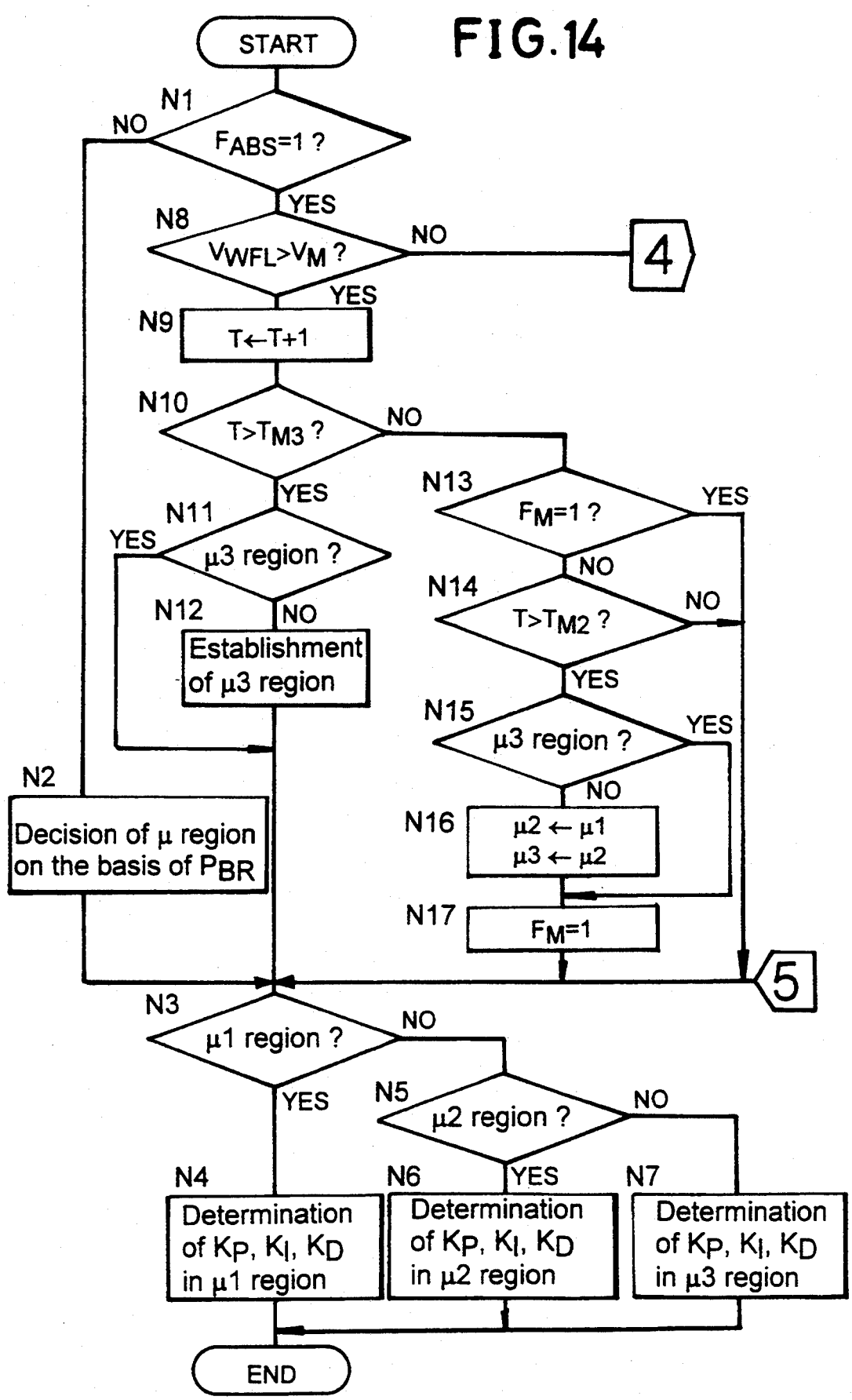
FIGS. 14 and 15 are portions of a flow chart illustrating a sub-routine for decision of friction coefficient regions and for determination of gain constants.
Figure 15:
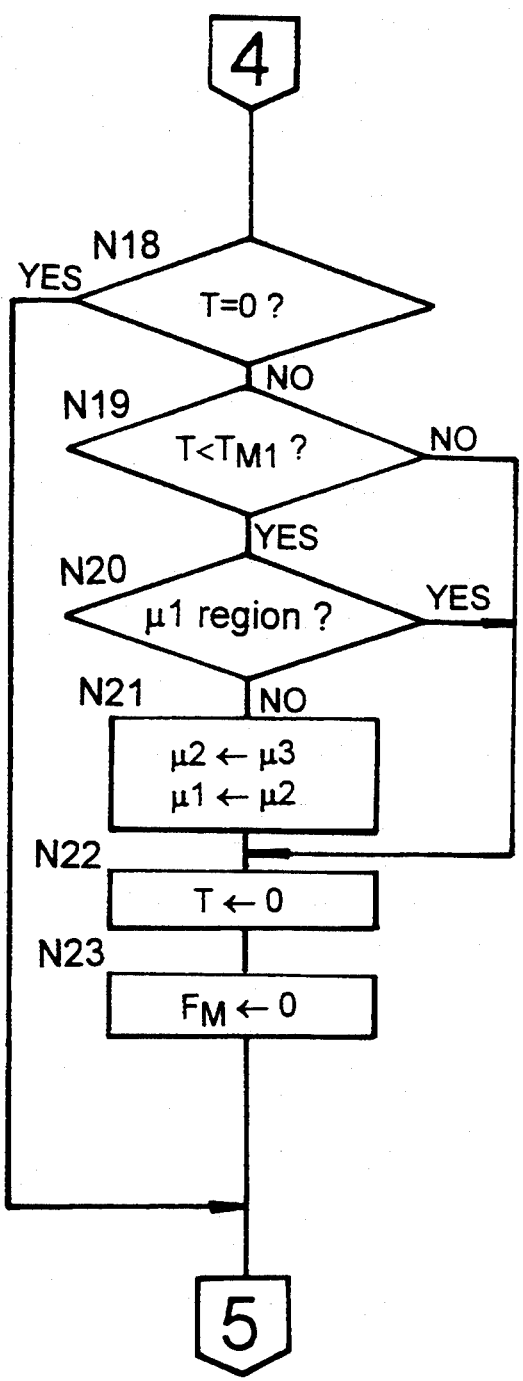

Referring to FIG. 13, at a 15th step S15 when the left front wheel speed $V_{WFL}$ is in the control region a, the friction coefficient region of the road surface is decided according to a sub-routine shown in FIGS. 14 and 15, and the gain constants $K_P$, $K_I$ and $K_D$, in the PID calculation, are determined on the basis of a result of the decision. At a first step N1 in FIG. 14, it is judged whether or not $F_{ABS}=1$. If it has been decided that $F_{ABS}=0$, i.e., at the start of the anti-lock control, the friction coefficient region is decided at a second step N2 on the basis of the reference braking pressure $P_{BR}$.

At a third step N3, it is judged whether or not the friction coefficient is in the low friction coefficient region, i.e., in the $\mu 1$ region. If it has been decided that the friction coefficient is in the $\mu 1$ region, the gain constants $K_P$, $K_I$ and $K_D$ in the PID calculation are determined at a fourth step N4 according to Table 1 described above.

If it has been decided at the third step N3 that the friction coefficient is not in the $\mu 1$ region, it is judged at a fifth step N5 whether or not the friction coefficient is in the medium friction coefficient region, i.e., in the $\mu 2$ region. If the braking pressure is in the $\mu 2$ region, the gain constants $K_P$, $K_I$ and $K_D$ are determined at a sixth step N6 according to Table 1 described above. If it has bene decided at the fifth step N5 that the friction coefficient is not in the $\mu 2$ region, the gain constants $K_P$, $K_I$ and $K_D$ are determined at a sixth step N7 according to Table 1 on the assumption that the friction coefficient is in the $\mu 3$ region.

If it has been decided at the first step N1 that $F_{ABS}=1$, i.e., that the anti-lock control is being continued, it is judged at an eight step N8 whether or not the left front wheel speed $V_{WFL}$ exceeds the friction coefficient decision speed $V_M$ ($V_{WFL}>V_M$). If it has been decided that $V_{WFL}>V_M$, the processing is advanced to a ninth step N9. If it has been decided that $V_{WFL} \leq V_M$, the processing is advanced to a 18th step N18, in FIG. 15.

At the ninth step N9, "1" is added to the time count value T, and at a next 10th step N10, it is judged whether or not the time count value T is larger than the count decision value $T_{M3}$. If it has been decided that $T \leq T_{M3}$, it is judged at an 11th step N11 whether or not the friction coefficient is in the $\mu 3$ region. If it has been decided at the 11th step N11 that the friction coefficient is not in the $\mu 3$ region, i.e., is in the $\mu 2$ region, the $\mu 3$ region is established at a 12th step N12, the progressing is advanced to the third step N3. If it has been decided at the 11th step N11 that the friction coefficient is in the $\mu 3$ region, the processing is advanced to the third step N3 to bypass the 12 step N12.

If it has been decided at the 10th step N10 that $T \leq T_{M3}$, the processing is advanced to the 13th step N13, where it is judged whether or not a flag $F_M$ is "1". This flag $F_M$ indicates whether or not the time count value T exceeds the count decision value $T_{M2}$. When $T>T_{M2}$, $F_M$ is equal to 1. And when T is equal to or less than $\leq T_{M2}$, $F_M$ is equal to 0.

If it has been decided at the 13th step N13 that $F_M=1$, the processing is advanced to the third step N3. If it has been decided that $F_M=0$, it is judged at a 14th step N14 whether or not $T>T_{M2}$. If $T>T_{M2}$, the processing is advanced to a 15th step N15, and if $T \leq T_{M2}$, the processing is advanced to the third step N3. At the 15th step N15, is judged whether or not the friction coefficient is in the $\mu 3$ region. If it has been decided that the friction coefficient is not in the $\mu 3$ region, i.e., is in the $\mu 1$ or $\mu 2$ region, the $\mu 1$ region is changed to the $\mu 2$ region, or the $\mu 2$ region is changed to the $\mu 3$ region at a 16th step N16. Then, at a 17th step N17, the flag $F_M$ is set at "1", the progressing is advanced to the third step N3. If it has been decided at the 15th step N15 that the friction coefficient is in the $\mu 3$ region, the processing is advanced to the 17th step N17 to bypass the 15th step N15.

At the 18th step shown in FIG. 15, it is judge whether or not the time count value T is "0",. If it has been decided that the time count value T is "0", the processing is advanced to the third step N3 (FIG. 14). If it has been decided that $T \neq$ "0", the processing is advanced to a 19th step N19. It is judged at the 19th step N19 whether or not the time count value T is less than the count decision value $T_{M1}$. If it has decided that $T<T_{M1}$, it is judged at a 20th step N20 whether or not the friction coefficient is in the $\mu 1$ region. If it has been decided that the friction coefficient is not in the $\mu 1$ region, i.e., is in the $\mu 2$ or $\mu 3$ region, the $\mu 2$ region is changed to the $\mu 1$ region, or the $\mu 3$ region is changed to the $\mu 2$ region at a 21th step N21, and the progressing is advanced to a 22th step N22. If it has been decided at the 20th step that the friction coefficient is in the $\mu 1$ region, the processing is advanced to the 22th step N22 to bypass the 21th step N21.

At the 22th step N22, the time count value t is cleared, and at a 23th step N23, the flag $F_M$ is set at "0". The progressing is advanced to step N3.

If it has been decided at the 19th step N19 that $T \geq T_{M1}$, the time count value T is cleared at the 22th step N22, and the flag $F_M$ is set at "0" at a 23th step N23. Then, the progressing is advanced to the third step N3.

In this way, a time period which the left front wheel speed $V_{WFL}$ exceeds the friction coefficient decision speed $V_M$ is counted in the sub-routine. On the basis of the count value, it is judged in which region (the $\mu 1$, $\mu 2$ and $\mu 3$ regions) the friction coefficient exists, and these regions are changed one to another. The gain constants $K_P$, $K_I$ and $K_D$ in the PID calculation are determined for every friction coefficient region.

Referring again to FIG. 13, the PID calculation is carried out at a 16th step S16 using the gain constants $K_P$, $K_I$ and $K_D$ determined at the 15th step S15. The calculation of an operation control quantity $P_{Y1}$ ($=P_{BR}-P_{PID}$) is carried out at a 17th step S17, and the progressing is advanced to a 24th step S24.

At the 18th step S18 when the left front wheel speed is in the control region b, the calculation of an operation control quantity $P_{Y2}$ ($=P_{10}-D_I$) is carried out, and at a 19th step S19, the operation control quantity $P_{Y2}$ is saved, following which the P and I terms in the PID calculation are cleared at a 20th step S20. Then, the progressing is advanced to the 24th step S24.

Further, at the 21th step S21 when the left front wheel speed is in the control region c, the calculation of an operation control quantity $P_{Y2}(=P_{20}-D_I)$ is carried out, and at the 22th step S22, the operation control quantity $P_{Y2}$ is saved, following which the P and I terms in the PID calculation are cleared at the 23th step S23. Then, the progressing is advanced to the 24th step S24.

At the 24th step S24, it is judged whether or not the operation control quantity $P_Y$ (which is $P_{Y1}$ when the left front wheel speed $V_{WFL}$ is in the control region a, and which is $P_{Y2}$ when the left front wheel speed is in the control region b or c) is less than the demand value $P_{TF}$ of braking pressure ($P_Y<P_{TF}$). If $P_Y<P_{TF}$, $P_Y$ is selected at a 25th step S25. If $P_Y \geq P_{TF}$, $P_{TF}$ is selected at a 26th step S26. Then, at a 27th step S27, the operation control quantity is saved to complete the processing procedure of one cycle.

It is desirable that the braking pressure is not rapidly restored to the amount of brake pedal 14 depressed at the end of the anti-lock control. For this purpose, a processing procedure as shown in FIG. 16 has previously been established.

Figure 16:
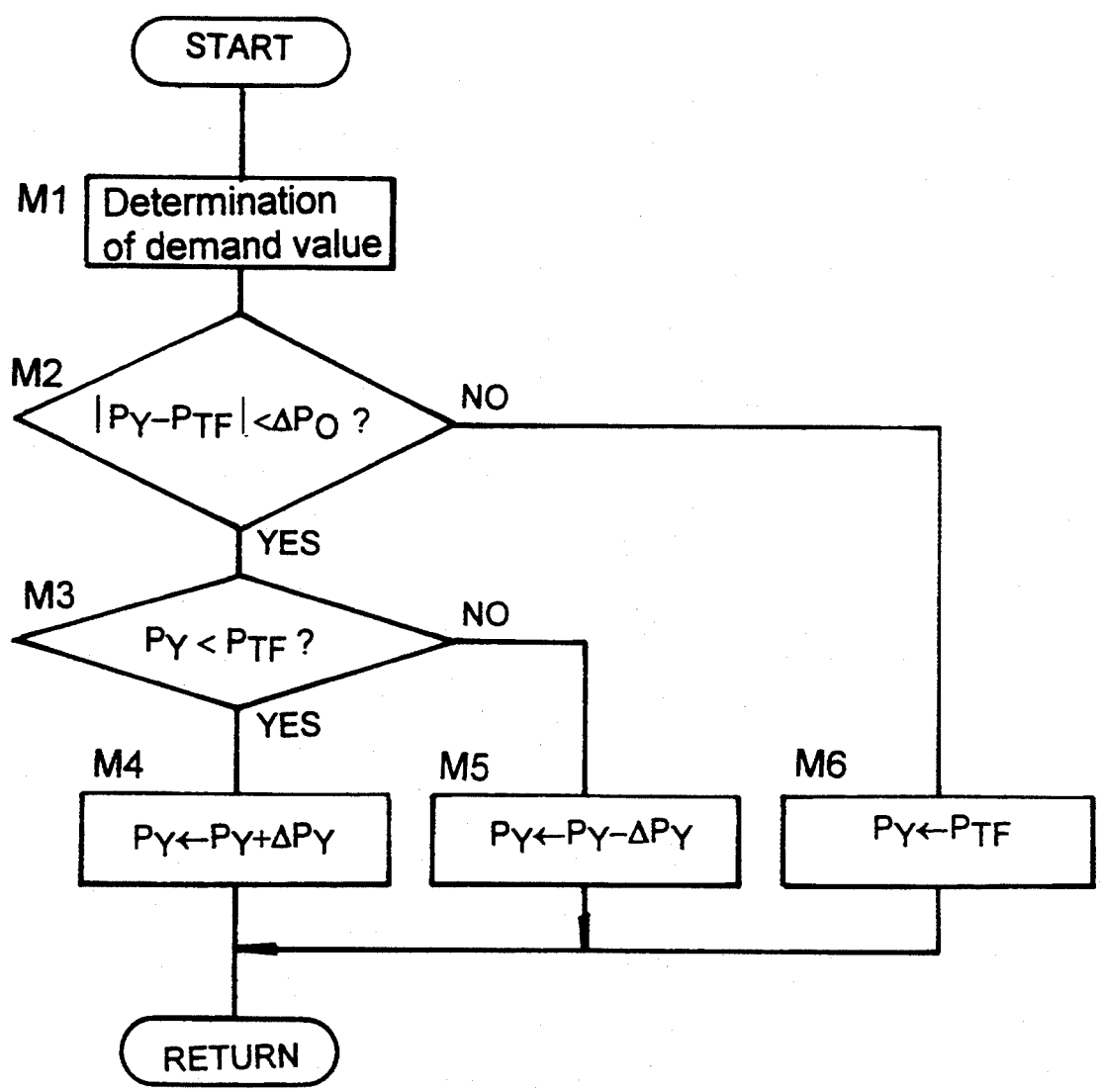
FIG. 16 is a flow chart illustrating a processing procedure at the end of the anti-lock control.

At a first step M1 in FIG. 16, the demand value $P_{TF}$ of braking pressure is determined according to FIG. 4. At a second step M2, it is judged whether or not the absolute value $|P_Y-P_{TF}|$ of a deviation between the operation control quantity $P_Y$ and the braking pressure demand value $P_{TF}$ exceeds a given value $\Delta P_O$. In other words, it is judged at the second step M2 whether or not the deviation between the operation control quantity $P_Y$ and braking pressure demand value $P_{TF}$, which is determined by the amount of brake pedal 14 depressed, exceeds a predetermined value. If the result shows that $|P_Y-P_{TF}|>\Delta P_O$, the processing is advanced to a third step M3.

At the third step M3, it sri judged whether or not $P_Y<P_{TF}$. If it has been decided that $P_Y<P_{TF}$, the operation control quantity $P_Y$ is determined at "$P_Y+$a given value $\Delta P_Y$" at a fourth step M4. If it has been decided that $P_Y \geq P_{TF}$, the operation control quantity $P_Y$ is determined at "$P_Y-\Delta P_Y$" at a fifth step M5.

If it has been decided at the second step M2 that $|P_Y-P_{TF}| \leq \Delta P_O$, the operation control quantity $P_Y$ is determined at $P_{TF}$ (i.e., $P_Y=P_{TF}$).

In this manner, it is possible at the end of the anti-lock control to gradually restore the braking pressure in accordance with the amount of brake pedal 14 operated.

Although the embodiment of the present invention has been described in detail, it will be understood that the present invention is not limited thereto, and various modifications in design can be made without departing from the spirit and scope of the invention defined in claims.

What is claimed is:

1. An anti-lock control method for a vehicle, comprising the steps of:

calculating an operation control quantity on the basis of a braking pressure at the start of an anti-lock control when a wheel is about to be locked during braking;

controlling the operation of an actuator capable of adjusting the braking force of a wheel brake to reduce the braking force;

correcting said braking pressure at the start of the anti-lock control in accordance with a degree of a wheel locking tendency to determine an adjusted reference braking pressure; and calculating another operation control quantity on the basis of said adjusted reference braking pressure, wherein the step of controlling the operation of the actuator includes the step of controlling the operation of the actuator capable of adjusting the braking force of the wheel brake by the another operation control quantity to reduce the braking force.

2. An anti-lock control method for a vehicle according to claim 1, wherein said actuator is an electric actuator in which the braking pressure corresponds to a quantity of electricity applied to the actuator, and the braking pressure at the start of the anti-lock control is presumed on the basis of the quantity of electricity applied to said actuator.

3. An anti-lock control method for a vehicle according to claim 1 or 2, further comprising the steps of:

determining a demand value of the braking pressure in accordance with a brake operating force;

calculating a lower one of said operation control quantities based on said adjusted reference braking pressure and said demand value of said braking pressure; and selecting said lower one of said operation control quantities based on said adjusted reference braking pressure and said demand value of said braking pressure as a final determined operation control quantity for said actuator.

* * * * *